(12) United States Patent
Looney et al.

(10) Patent No.: US 7,160,471 B2
(45) Date of Patent: Jan. 9, 2007

(54) IN-SITU GENERATION OF OXYGEN-RELEASING METAL PEROXIDES

(75) Inventors: Brian B. Looney, Aiken, SC (US); Miles E. Denham, Aiken, SC (US)

(73) Assignee: Westinghouse Savannah River Company, LLC, Aiken, SC (US)

( * ) Notice: Subject to any disclaimer, the term of this patent is extended or adjusted under 35 U.S.C. 154(b) by 0 days.

(21) Appl. No.: 10/976,089

(22) Filed: Oct. 27, 2004

(65) Prior Publication Data

US 2005/0058512 A1     Mar. 17, 2005

Related U.S. Application Data

(63) Continuation of application No. PCT/US2003/014171, filed on May 6, 2003.

(51) Int. Cl.
  *B09C 1/08* (2006.01)
  *C02F 1/72* (2006.01)
(52) U.S. Cl. ............... 210/747; 210/758; 210/759; 405/128.5; 405/128.75; 405/128.45
(58) Field of Classification Search ........ 405/128.5, 405/128.75, 128.45; 210/758, 759, 747
See application file for complete search history.

(56) References Cited

U.S. PATENT DOCUMENTS

| | | | | |
|---|---|---|---|---|
| 4,591,443 | A | * | 5/1986 | Brown et al. ............ 210/747 |
| 5,264,018 | A | * | 11/1993 | Koenigsberg et al. ........ 71/63 |
| 5,700,107 | A | * | 12/1997 | Newton ............... 405/128.75 |
| 5,741,427 | A | * | 4/1998 | Watts et al. ............. 210/747 |
| 6,019,548 | A | | 2/2000 | Hoag |
| 6,206,098 | B1 | | 3/2001 | Cooper |
| 6,268,205 | B1 | * | 7/2001 | Kiest et al. ............. 435/262.5 |
| 6,319,328 | B1 | * | 11/2001 | Greenberg et al. ............ 134/2 |
| 6,623,211 | B1 | | 9/2003 | Kukor |
| 6,623,646 | B1 | | 9/2003 | Bryant |
| 6,746,180 | B1 | | 6/2004 | Kukor |
| 6,843,618 | B1 | * | 1/2005 | Lundy ............... 405/128.75 |
| 2002/0002983 | A1 | * | 1/2002 | Greenberg et al. ............ 134/2 |
| 2002/0034421 | A1 | * | 3/2002 | Kukor et al. .......... 405/128.75 |
| 2002/0110509 | A1 | * | 8/2002 | Lundy ..................... 423/143 |

(Continued)

OTHER PUBLICATIONS

Defibaugh, S.T., and Fischman, D.S., 1999, Biodegradation of MTBE utilizing a magnesium peroxide compound-A case study, in Alleman, B.C., and Leeson, Andrea, eds., In Situ Bioremediation of Petroleum Hydrocarbons and Other Organic Compounds, V. 3, Fifth International In Situ and Onsite Bioremediation Symposium, San Diego, Calif., Apr. 19-22, 1999 [Proceedings]: Battelle Publications, p. 1-6.*

(Continued)

*Primary Examiner*—Katherine Mitchell
(74) *Attorney, Agent, or Firm*—McNair Law Firm, P.A.

(57) ABSTRACT

A method for remediation of contaminants in soil and groundwater is disclosed. The method generates oxygen releasing solids in groundwater or soil by injecting an aqueous energetic oxidant solution containing free radicals, oxidative conditions can be created within or ahead of a contaminant plume. Some contaminants may be remediated directly by reaction with the free radicals. Additionally and more importantly, the free radicals create an oxidative condition whereby native or injected materials, especially metals, are converted to peroxides. These peroxides provide a long-term oxygen reservoir, releasing oxygen relatively slowly over time. The oxygen can enhance microbial metabolism to remediate contaminants, can react with contaminant metals either to form immobile precipitants or to mobilize other metals to permit remediation through leaching techniques. Various injection strategies for injecting the energetic oxidant solution are also disclosed.

10 Claims, 5 Drawing Sheets

U.S. PATENT DOCUMENTS

| | | | |
|---|---|---|---|
| 2003/0143030 A1* | 7/2003 | Greenberg | 405/128.75 |
| 2003/0210957 A1* | 11/2003 | Kukor et al. | 405/128.75 |
| 2004/0165956 A1* | 8/2004 | Greenberg | 405/128.75 |
| 2005/0058512 A1* | 3/2005 | Looney et al. | 405/128.25 |

OTHER PUBLICATIONS

EPA, Treatment Technologies for Site Cleanup: Annual Status Report (11th Ed); EPA-542-R-03-009, Feb. 2004, downloaded from http://clu-in.org/download/remed/asr/11/asr.pdf, pp. 1,3, and 175 (D27).*

Regenesis, Oxygen Release Compounds (ORC®), undated, downloaded from http://www.environmental-expert.com/technology/regenesis/sub-products.htm, 10 pages.*

Regenesis, Oxygen Release Compounds (ORC®), undated, downloaded from http://www.environmental-expert.com/technology/regenesis/ORC%20Brochure.pdf, 2 pages.*

Defibaugh et al. "Biodegradation of MTBE Utilizing a Magnesium Peroxide Compound: A Case Study", from www.environmental-center.com/articles/article 1035/article1035.htm; EnvironmentalExpert.com Articles, published 2001 (month unknown) pp. 1-6.

Reed et al. "JP-4/JP-8 Bioremediation Using ORC Pumped into Semi-Permanent Injection Wells", from www.environmental-center.com/articles; EnvironmentExpert.com Articles, Presented Jun. 3-7, 2001 pp. 1-7.

* cited by examiner

IN-SITU GENERATION OF OXYGEN-RELEASING METAL PEROXIDES

CROSS REFERENCE TO RELATED APPLICATIONS

This application is a continuation of PCT/US2003/014171 filed May 6, 2003 and priority therefrom is claimed.

STATEMENT OF GOVERNMENT RIGHTS

The United States Government has rights in this invention pursuant to Contract No. DE-AC09-96SR18500 between the U.S. Department of Energy and Westinghouse Savannah River Company.

FIELD OF THE INVENTION

This invention relates to the treatment of contaminants in groundwater and soil by providing a beneficial, long-term source of oxygen to the contaminated groundwater or soil, and more particularly to the in situ formation of metal peroxides within said groundwater and soil that provide for the long-term generation of oxygen within the groundwater and soil.

BACKGROUND OF THE INVENTION

Contaminants in groundwater and soil are a significant environmental concern. Many industrial operations produce different types of contaminants that are introduced into water systems such as subsurface aquifers. The contaminants and the resulting contaminated groundwater form plumes that move through the aquifer. Such plumes may eventually enter areas of the aquifer from which water is normally drawn for agricultural or residential use, or may eventually crop out into other water systems such as streams and lakes.

The contaminants of concern encompass a wide variety of materials. These materials may be organic substances such as hydrocarbons (e.g., benzene, toluene, and related compounds, typically from petroleum) and industrial chemicals and solvents (e.g., trichloroethylene, tetrachloroethylene, pesticides, and similar compounds). The contaminants may also be inorganic elements and compounds such as metals (e.g., cadmium, chromium, and lead), radionuclides (e.g., uranium, plutonium, and others), and acids and bases. The contaminants may arise from any of a wide array of human technological and industrial activities such as chemical and nuclear production, processing, storage, transportation, and distribution.

One method of treating such contaminants involves first locating the plume of contaminated groundwater. Wells are drilled into the plume or at a location just ahead of the plume. The contaminated groundwater is extracted through the wells and passed to a processing operation. The processing operation may consist of reactor vessels or filters that operate either to remove the contaminants from the water or to mix the contaminated water with chemicals that neutralize, precipitate, or otherwise destroy the contaminants. The remediated water is then again injected into the ground.

This method of treating groundwater is energy and resource intensive. It can and does take months or years of constant pumping and treatment to successfully decontaminate a single contaminated plume. The energy expenditure for the pumping operations is very high, and the chemicals used to treat the contaminants must be continually replaced.

Another method of testing contaminated groundwater is to inject a treatment solution into the groundwater. The treatment solution is often an aqueous solution of a material or combination of materials. The material is injected into or ahead of the plume such that the plume mixes with the material. The material may react with the contaminants in a variety of reactions. One such reaction is precipitation, which effectively immobilizes the contaminant. Another type of reaction is one in which the material reacts with the contaminant to convert the contaminant to a harmless compound.

One promising method of decontamination of groundwater is the use of oxygen or oxidizing materials. Oxygen is useful for several different types of remediation of contaminants. For organic contaminants, an injection into the groundwater of oxygen or oxygen producing materials can enhance the growth of microbes native to the soil through which the contaminants flow. The microbes in turn utilize the organic contaminants as food sources, effectively converting them to harmless by-products. An example of this approach is found in U.S. Pat. No. 5,264,018 entitled "Use of Metallic Peroxides in Bioremediation" which issued Nov. 23, 1993 to Stephen Koenigsberg et al.

Oxygen can also enhance the precipitation, and hence immobilization, of certain metals, either by oxidizing metals that co-precipitate with the contaminant metals. Conversely, the presence of oxygen is also useful in enhancing the solubility in water of certain metals, such as chromium and uranium, enabling the extraction of the solubilized metals by filtration or other treatment.

Providing an oxygen rich environment is a contaminated plume, however, is problematic. Many materials other than the contaminants will take up oxygen and, because of its low solubility, oxygen will not adequately permeate a volume of soil or water when introduced from a single source or even a plurality of "point sources." For the same reason, injected oxygen cannot spread far from the site of injection, meaning that the effective area of treatment is relatively small. Also, the formation of insoluble precipitates such as ferric hydroxide tend to clog the injection apparatus. These problems require the constant injection of oxygen, which is likewise energy and resource intensive; the placement of a large number of injection sites; and the constant unclogging of injection apparatus.

One recent attempt to provide an oxygenated environment for the treatment of contaminants involves the use of a metal peroxide. Magnesium peroxide, sold under the tradename ORC® (Regenesis, Inc., San Clemente, Calif.) has been placed in closely spaced wells or boreholes. This metal peroxide provides a slow, fairly constant release of oxygen in the presence of water. The oxygen stimulates the environmental clean up. The material is placed in permeable containers that are in turn placed in the wells. A significant drawback to this method is the limitation on placement of the material and exposure to the contaminants. To provide the needed oxygen enriched solution, many closely spaced wells must be drilled, requiring the expenditure of resources for the wells. Moreover, the geographic extent of the enriched oxygen is fairly limited, due to the fact that many materials that are not contaminants will utilize the available oxygen near its injection site at the borehole, preventing the peroxide or the released oxygen from significantly permeating the surrounding groundwater.

It has also been attempted to inject slurries of this product into subsurface areas in an attempt to treat contaminants.

Typically, one or more boreholes are drilled and then filled with the slurry. The slurry material is immobile and, while releasing oxygen to the immediate environment, is subject to the drawbacks described above. This procedure requires closely spaced wells for injecting the slurry, and has not been found to adequately overcome the drawbacks mentioned above.

There is thus a continuing need for improvements in the remediation of contaminants in soil and groundwater.

SUMMARY OF THE INVENTION

It is an object of this invention to provide an improved method for remediation of contaminants in groundwater and soil.

It is a further object of this invention to provide a method for remediating contaminants in groundwater and soil by providing a widespread long-term source of oxygen for the treatment of such contaminants.

It is also an object of this invention to provide a means for creating oxidative conditions in groundwater and soil sufficient to precipitate certain contaminants to immobilize the contaminants.

It is another object of this invention to provide a means for generating oxygen in situ in groundwater or soil to promote the growth of microbial agents useful in remediating contaminants in the groundwater or soil.

It is also an object of this invention to provide a method resulting in the long-term generation of oxygen in situ, wherein varying injection strategies may be used.

These and other objects of the invention are accomplished by providing a method for the in situ treatment of contaminants in soil or in groundwater by providing an energetic oxidant solution containing free radicals and contacting peroxidizable metals in the soil with an amount of the energetic oxidant solution sufficient to convert the peroxidizable metals to metal peroxides, whereby the metal peroxides generate oxygen in situ for the treatment of the contaminants.

These and other objects of the invention are accomplished by providing a method for in situ treatment of contaminants in groundwater or soil by creating s solution containing energetic oxidants in the form of free radicals, injecting said solution into a subsurface area associated with said groundwater or soil in an amount sufficient for the formation of solid metal peroxides and other oxygen releasing solids, whereby said solids form a long-term source of oxygen for the treatment of said contaminants.

These and other objects of the invention are also accomplished by providing a method for in situ treatment of contaminants in groundwater or soil by providing precursor reagents, the mixture of which will produce an energetic oxidant solution containing free radicals, injecting the precursor reagents together, separately, or as a mixture into the soil or groundwater to be treated in an amount sufficient such that the created free radicals peroxidize materials in the soil or groundwater, whereby the peroxidized materials provide for the long-term release of oxygen sufficient to treat said contaminants. The methods for injecting the reagents and/or the energetic oxidant solution may be varied to enable the most efficient use of the reagents and/or solution.

BRIEF DESCRIPTION OF THE DRAWINGS

In the drawings which are attached hereto and made a part of this disclosure by ay of illustration and not limitation.

DETAILED DESCRIPTION OF THE INVENTION

Figure 1:
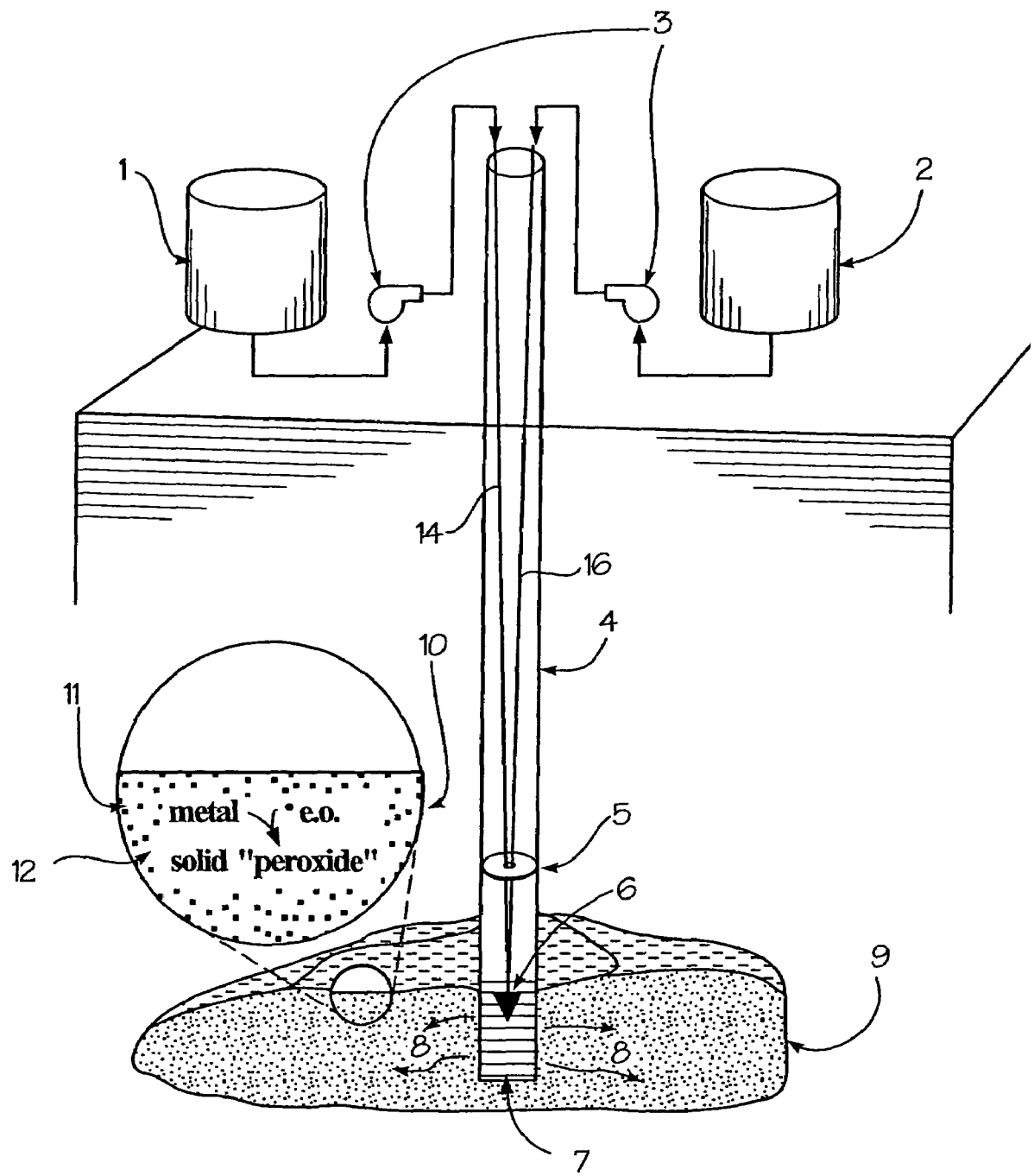
FIG. 1 is a diagrammatic illustration of apparatus for practicing a first preferred embodiment of the method of the current invention.

Where oxygen is used to remediate contaminants in groundwater, the dissolved oxygen concentration is the primary determinant of biogeochemical conditions in subsurface systems. Furthermore, the aqueous solubility of oxygen is a significant limitation in systems where aerobic conditions are optimal or necessary for remediation. The concentration of oxygen must be high enough to effect the desired reactions and/or to enhance the growth and activity of biological agents. The oxygen must also be accessible to the agents, so it must be in a water-soluble form.

Dissolved oxygen can also be used to control the mobility of reduction—oxidation (redox) sensitive metals and radionuclides. Such metals and radionuclides are commonly found at a variety of sites such as coal pile run-offs, acid drainage from mine tailings, and other "leach based" sources. As noted above, the presence of oxygen in groundwater will enhance the formation of insoluble metal oxides from the harmful metals. These oxides precipitate from solution and are removed as contaminants of the groundwater because they are immobilized. For other metals, the presence of oxygen in the groundwater will, conversely, enhance the mobility of the metal, thus making it possible to extract the metal by extracting the groundwater. The extracted groundwater can then be treated to remove these types of metals. It is therefore desirable to have the ability to control to at least some extent the concentration of the oxygen in the groundwater or in an associated subsurface area.

A significant problem with using oxygen enrichment to control biogeochemical condition lies in the means to distribute the oxygen in an aqueous form. One means of accomplishing this is to inject an aqueous solution into the groundwater, the aqueous solution containing dissolved oxygen at a relatively high concentration controlled by aqueous solubility. Alternatively, the aqueous solution can contain oxygen-bearing reagents that decompose to release oxygen.

To treat an entire plume of contaminated groundwater, however, would require an enormous dedication of resources. It might be possible to map the entire outline of a plume, and then drill a number of wells or boreholes to allow injection of the aqueous solution throughout the plume. Alternatively, the path of the plume could be determined, and a number of wells drilled across the "front" of the plume such that the plume moved into the oxygenated region. Contaminated plumes, however, extend over a very wide area. The number of wells needed, and the amount of aqueous solution needed, are therefore prohibitive in cost and effort.

Moreover, as mentioned above, simply injecting an aqueous solution containing dissolved oxygen is generally not effective. The relatively low solubility of oxygen means that the oxygen itself would permeate the groundwater or the associated subsurface area only to the extent that the aqueous solution is made to permeate the area. The relatively high oxygen concentrations near the injection sites result in the formation of insoluble precipitates, such as metal hydroxides, that tend to both clog the injection apparatus and to render the surrounding subsurface material less permeable to fluid flow. Where aerobic bacteria are present, the increased oxygen results in rapid, localized growth, which in turn produces effects similar to that of the formation of insoluble precipitates.

It is therefore desirable to provide a method for efficiently introducing into the groundwater and/or the associated subsurface area a beneficial amount of oxygen. The method of this invention provides a way to effectively permeate the area of concern with an appropriate level of oxygen. The oxygen is ultimately provided in amounts and at rates that are sufficiently high to be of use in remediating the contamination, but are at the same time low enough to avoid undesirable effects of producing localized clogging by precipitates or bacteria.

The solution to this problem lies in the creation of metal peroxides. Metal peroxides and other oxygen releasing solids (collectively referred to herein as "metal peroxides") slowly react to release oxygen in a soluble form. They therefore form a solid reservoir of oxygen capable of providing a constant, relatively high concentration of oxygen dissolved in the aqueous environment of groundwater. The metal peroxides provide a long-term source of oxygen to subsurface water, enabling remediation of contaminants.

Metal peroxides, however, do not exist in sufficient concentrations in soil to provide the needed concentration of oxygen under native conditions. Placing metal peroxides within, or in front of, a plume of contaminants might serve but as with injecting dissolved oxygen, the expenditure of resources may be prohibitive. Numerous holes or excavations would need to be made to place the metal peroxides at the appropriate locations. The needed excavations would impose damage to the surface. Moreover, placement of discrete amounts of metal peroxides would not ensure that the oxygen resulting from the peroxides would be spread, or broadcast, throughout the entire plume. A certain amount of the contaminants, at least, would not be exposed to the high oxygen concentrations and would remain untreated. This is a problem similar to that faced in the use of ORC® metal peroxides that is, that to ensure sufficient treatment would require a significant expenditure of resources.

The method of current invention provides a solution to these problems. Through the use of the current invention, metals and other materials already in place throughout the soil through which the contaminant plume flows are converted to the peroxide form of the metal or are converted to similar (though not technically peroxide type) compounds that are (1) rich in oxygen and (2) release oxygen into the environment over a period of time. For the purposes of this invention, the term "peroxidizable metals" is used to refer to metals such as calcium and magnesium that will form solid peroxides upon contact with the energetic oxidant solution as discussed herein, and to other elements, compounds, or substances that, upon contact with the solution, will form oxygen-rich substances that will thereafter release oxygen over time. Peroxidizable metals may be native to the soil or be anthropogenic. As noted above, the peroxidizable metals as defined, after contact with the solution and conversion to the peroxide form, are for simplicity referred to herein as metal peroxides. These metals are already in situ and, in most cases, are thoroughly distributed throughout the soil. By converting them to peroxides, an in situ, low cost source of widespread peroxides is available. The metal peroxides resulting from the practice of the current invention then generate oxygen in situ over a long period of time. The widespread placement of the metals helps ensure that all parts of the contaminated plume experience a concentration of dissolved oxygen sufficient to cause the enhancement of biological activity or to promote the desired redox or other reactrions. Alternatively, an area ahead of the plume could be treated, creating a widespread "wall" of a highly oxygenated nature through which the plume would flow.

The method is applicable even to areas where the soil does not contain a sufficient concentration of peroxidizable metals that can be converted to metal peroxides. In these instances, suitable peroxidizable metals in dissolved form can be injected into the soil. A preferred category of peroxidizable metals that can be injected includes calcium and magnesium. Because they are dissolved, these substances will be broadcast over a large area of the subsurface region. They can then be converted to peroxides through use of the current invention, after which they will serve to produce the desired oxygen.

In a preferred embodiment of the current invention, native metals or injected (anthropogenic) metals are converted into peroxides by providing for the generation and/or presence of energetic oxidants in the groundwater. The energetic oxidants create a highly oxidizing condition, in which the metals are converted to peroxides.

The energetic oxidant solutions referred to herein are solutions the reactive moieties of which are free radicals. The free radicals are selected from several preferred categories. These categories, arranged in order of preference beginning with the most desirable for the current invention include, but are not limited to, solutions that contain reactive oxygen species such as the superoxide free radical $.O_2$), the hydroxyl free radical $(.OH)$, solutions that contain other oxygen containing free radicals (such as nitric oxide $(.NO)$, permanganate $(.MnO_4)$, or perchlorate $(.ClO_4)$, solutions that contain other free radicals (such as .oxalate or $(.Cl)$ in the presence of oxygen, and mixtures of the foregoing.

All of these radicals are highly unstable and are not suited to storage and transport. Such free radicals, or the energetic oxidant solutions containing them must be generated on-site, within the injection system, or in the subsurface system. The methods for injecting the energetic oxidant solutions, or alternatively the reagents from which the solutions are formed, may be varied to enable the most efficient use of the solutions and/or reagents. The method chosen may also depend on the nature of the subsurface system to be treated (e.g., the hydrogeologic conditions that obtain), the nature of the contaminants to be treated, and other known factors. In a preferred mode, rather than attempting to store and inject chemically unstable energetic oxidant solutions, the current invention employs a method of using a combination of chemicals that react to form free radicals. The chemical solutions that are mixed to permit the creation of the free radicals are referred to herein as energetic oxidant precursor reagents. There may be two or more precursor reagents, each of which contains one or more elements or compounds that, upon mixing with the other precursor reagent(s), will react to create the desired free radicals. The radicals so produced, when present in the subsurface system, then convert native or added (anthropogenic) metals and other subsurface materials into highly oxidized solid metal peroxides and other highly oxidized and oxygen-rich solid compounds. These solids then release oxygen slowly and act as a long-term "oxygen reservoir."

The free radicals in the energetic oxidant solution of the current invention are very powerful oxidizing agents. By themselves, they are very effective at destroying many types of organic compounds. Based on this information, the injection site(s), the injection rate, and the amount of solution injected can be selected such that there are sufficient free radicals in the solution to both directly treat, or remediate, such contaminants while also providing a sufficient quantity of free radicals to effect the formation of metal peroxides.

In one preferred embodiment of the invention, a combination of chemicals is injected into the groundwater to form therein the free radicals. A preferred combination of chemicals includes a peroxide compound, such as hydrogen peroxide, and a dissolved metal compound, such as ferrous sulfate. The particular combination of hydrogen peroxide and ferrous sulfate is also known as Fenton's reagent. The reaction of these two chemicals will produce free, dissolved, hydroxyl radicals in a concentration sufficiently high to convert metals to the corresponding peroxides. Because the chemicals are in solution, they will mix thoroughly with the existing subsurface water, and will permeate the soil in the associated subsurface area. The injection thus produces a very broad zone having the necessary concentration of free radicals, in this case hydroxyl radicals, forming in turn a very broad zone of metal peroxides.

The presence of the metal peroxides and the resulting high concentrations of oxygen will create a variety of remedial effects. Depending on the types and concentrations of contaminants, the amount of peroxides formed can be controlled to be relatively high or low as appropriate. The oxygen, naturally released in soluble form, provides a critical nutrient for aerobic microbes useful in treating many types of organic contaminants. Microbial growth can be further enhanced by combining the method of forming peroxides with other methods, such as those involving the addition of other nutrients calculated to enhance the remedial effect of the microbes.

In the case of sites where metals form the contaminants of concern, such as metal contaminated acid drainage sites, the continuous supply of oxygen from the peroxides creates an environment in which dissolved ferrous iron is converted to ferric iron. Iron is a ubiquitous element in most grounds. In its ferrous state, is of relatively little use for contaminant remediation. In its ferric state, however, it is very effective in co-precipitating a number of contaminating metals. The precipitated metals are immobilized and will not be transported to downstream water sources. The precipitated metals may either be left in the soil, or the soil can thereafter be treated to remove the metals. As stated above, for other metals the presence of oxygen will enhance the mobility of the metals. By using known extraction techniques, these solubilized metals can then be extracted from the subsurface water for treatment.

Metal peroxides are solid compounds formed under highly oxidizing conditions. As described for one preferred embodiment, the injection of hydrogen peroxide and ferrous sulfate will allow these compounds to react to form the necessary conditions. Univalent and divalent metal cations will precipitate to metal peroxides by stoichiometric reactions as follows:

$$M^{+x}+xOH^-=MO_x+xH^+ \quad (1)$$

As long as the conditions remain oxidizing, the peroxides will be stable in the peroxide form. Once the oxidizing conditions are removed, however, and the metal peroxides exposed to water, the peroxides will release oxygen by the following reaction:

$$4MO_x+4xH=4M+2xH_2O+xO_2 \quad (2)$$

The two constraints on the creation of metal peroxides by hydroxyl radicals are the availability of appropriate metals and the conditions that thermodynamically favor such reactions. If these constraints are met in a selected subsurface region such as an aquifer, metal peroxides can be created by the injection of reagents that will produce the hydroxyl radicals. The peroxides persist after injection, providing oxygen to the dissolved groundwater as they degrade.

Two metals typically available in aquifers are magnesium and calcium. These metals form peroxides under the proper conditions. In a sample of an aquifer believed to have lower than normal concentrations of these two metals, the metals were found in concentrations of 0.09 meq/100 g of exchangeable magnesium and 0.01 meq/100 g of exchangeable calcium. These data suggest that there are 10 mg of magnesium and 2 mg of calcium available for reaction at this site per kilogram of soil, not including magnesium and calcium bound at mineral surfaces. These are not the only metals available for conversion to peroxide. Moreover, if an insufficient amount of native metal exists, metals such as magnesium and calcium can easily be injected into the subsurface region. Even at this site then, with lower than normal levels, there are sufficient metals to form peroxides under the appropriate conditions.

Figure 4:
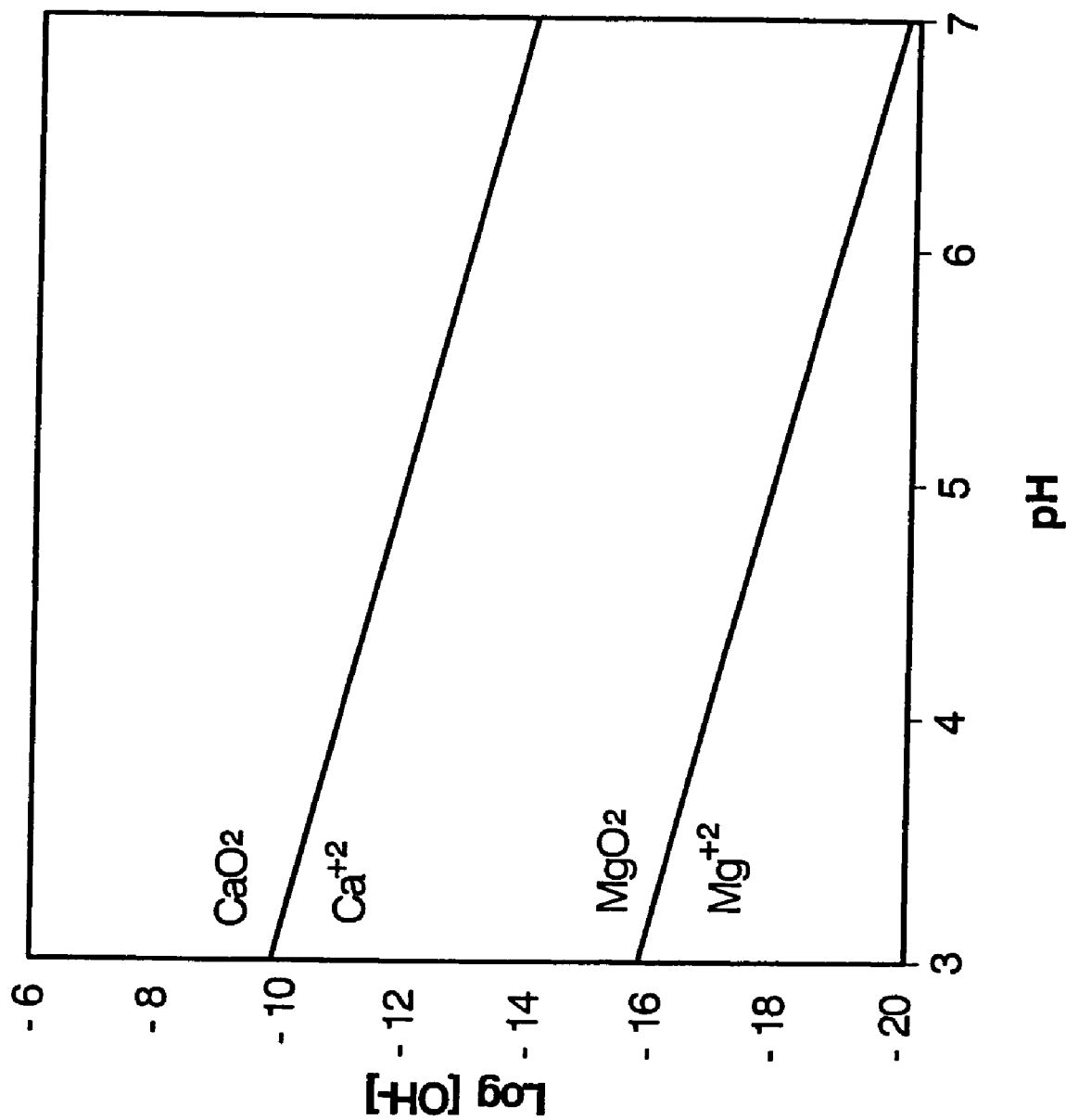
FIG. 4 is a plot showing the stability of calcium and magnesium peroxides with varying pH and hydroxyl radical concentrations, calculated for $Ca^{++}$ concentration of 2 mg/l and $Mg++$ concentration of 0.5 mg/l.

As to thermodynamic conditions, the equilibrium constant for the formation of calcium peroxide from calcium is log K=17.9. For magnesium, log K=30.4. FIG. 4 shows these reactions plotted in log [OH] vs pH space. The peroxides of calcium and magnesium are stable at very low hydroxyl radical concentrations. It is therefore shown that these peroxides are thermodynamically stable, and may be produced in a typical aquifer in the presence of hydroxyl radicals.

Figure 5:
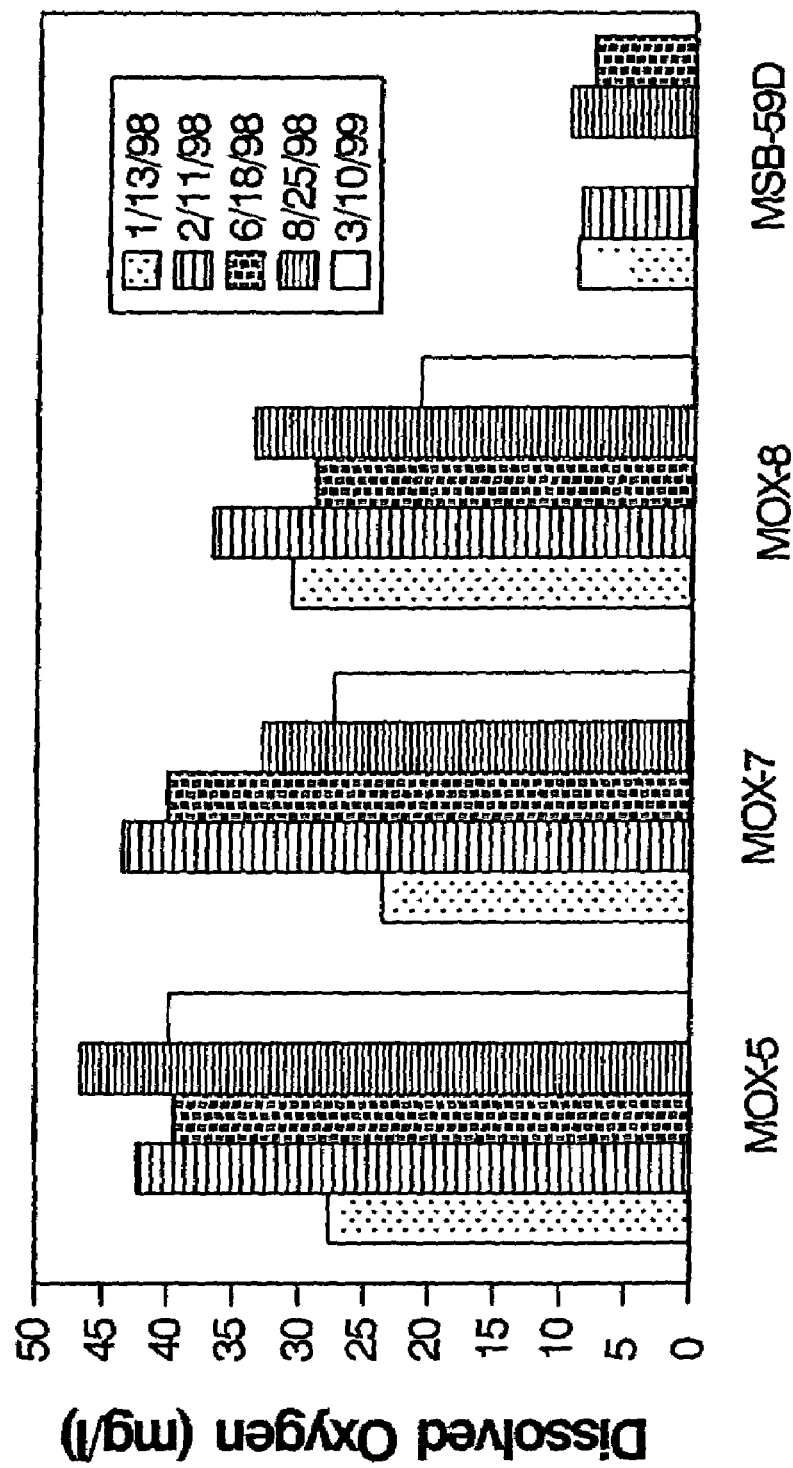
FIG. 5 is a table showing dissolved oxygen concentrations measured in groundwater at a test site following injection of a solution according to the invention, where MOX-5, MOX-7 and MOX-8 show oxygen concentrations drawn from wells at a treated site and MSB-59D shows samples drawn from untreated groundwater. The bars for each well represent different sampling events according to the inset key.

Data were derived from a remediation effort at a contaminated site. The site was contaminated with trichloroethylene and tetrachloroethylene present as a dense non-aqueous phase liquid (DNAPL). Fenton's reagent was injected directly into the contaminated site. The reagent successfully destroyed the DNAPL contaminant. For a period of two years thereafter, the groundwater at the site was tested for dissolved oxygen. It was found that for this entire period, the dissolved oxygen level at the site was 300 to 500% of the expected values based on saturation with atmospheric oxygen. FIG. 5 shows these data. In the figure MOX-5, MOX-7, and MOX-8 were monitoring wells at the site from which samples were drawn. MSB-59D was an upgradient background well.

These data demonstrate the effectiveness of metal peroxides in providing long-term oxygenation of the treatment site. The treatment resulted in a long term, relatively high level of dissolved oxygen available for remediation of contaminants. The data also illustrate a parameter of the method concerning the amount of the reagents used to produce the hydroxyl radicals. In this case, it was required that the amount of reagents injected to produce the long-term production of dissolved oxygen exceeded the amount of reagent that directly affected the DNAPL. Other conditions may obtain at a given site requiring adjustment of the amount of injected material. Sampling techniques to determine the type and amount of contaminants at a given site or in a given plume will provide information on the conditions.

The method of this invention is to inject into groundwater or into a subsurface area an aqueous, energetic oxidant solution. The energetic oxidant solution may be formed prior to injection, during the injection process, or, as described below, by the injection of reagents which, upon mixing, will produce an energetic oxidant solution. The injection will result in the formation of metal peroxides. These metal peroxides will then act as thermodynamically stable materials that will produce enhanced oxygen levels in situ for prolonged periods of time. Some of the contaminants may be remediated by the constituent free radicals of the solution, while others are remediated through the action of the released oxygen. The released oxygen will treat certain types of contaminants directly, as by chemical reactions that immobilize the contaminants or by reactions that convert the contaminants into relatively harmless substances. The released oxygen can also serve to indirectly treat contaminants, as by supplying a critical element for the growth of bacteria that in turn remove contaminants by, e.g., metabolic processes.

It is an aspect of this invention to determine, for a particular contaminant plume, the appropriate use of the creation of metal peroxides. These steps include first determining the nature of the contaminants within the plume. This may be accomplished by known sampling techniques. The size and shape of the plume are also determined. In many plumes, contaminants have become stratified by a variety of causes, such as the type of contaminant, the "filtering" effect of the soil through which the contaminants are moving, and other factors. This assay will enable determination of the most effective placement of the injection sites for a solution according to this invention. Frequently, it will be desirable to inject ahead of the plume so as to create an oxygen-enhanced zone through which the contaminants will eventually pass, but other locations may be advisable.

The method also may include the step of assaying the soil through which the plume is moving. This will reveal information such as the density of the soil, the predicted path through the soil that the plume will move, and similar hydrogeologic data. These data will help determine the placement of injection sites.

The soil can be also assayed for information relating to the contents of the soil, and, in particular to the presence and amount of native materials that may be useful in the conduct of the method. As discussed above, the injection of a solution according to this invention can contain a soluble metal compound such that the metal is converted to the desired metal peroxide. Injection of the solution can also be used to convert native materials to metal peroxides also. An assay of the relevant subsurface area will indicate the types and amounts of native materials, based on which the metal content of the injected solution can be varied.

The assays of the contaminants and the soil will also provide an indication of the levels of oxygen that will be effective to treat the contaminants. For certain contaminants, it may be desirable to create a relatively short zone through which the plume will pass, the relatively short zone having a relatively high concentration of metal peroxides and thus a relatively high level of oxygen. For other contaminants, it may be more effective to create a larger, and particularly a longer, zone having a lower level of enhanced oxygen. The selection of the type of solution to use and the type of zone to create can be made based on known factors relating to the type of contaminant to be treated, the desired treatment reactions and the like. The method is then completed by the provision of injection sites and the injection of the appropriate solution.

The effective amount of oxygen needed to treat the contaminants will vary depending on the mechanism by which the contaminants are to be remediated. In the case, for example, of contamination by metals, the oxygen will be needed at a level sufficient to effect conversion of the metal to an insoluble oxide or hydroxide compound so as to immobilize the metal. In the case where it is desirable to remediate the contaminants via the metabolic conversion of the contaminant by bacteria, the amount of oxygen will be derived by calculating the amount of oxygen needed to enhance the population growth of the bacteria to a level sufficient to achieve such metabolic conversion.

In addition to the other advantages offered by this invention, the use of the reagents and aqueous solution also permit the successful use of a variety of injection strategies. These strategies can be tailored to the type, location, and speed of travel of the contaminants within the groundwater or soil. Other factors, such as the presence or absence of surface structures, the relative permeability of the soil through which the groundwater is moving, and others, may also influence the injection strategy.

A typical injection process for reagents of the type described herein involves the use of a single injection site, such as a single injection well or borehole. This injection process is diagrammatically illustrated in FIG. 1. FIG. 1 shows a single injection well 4 extending from, at, or near the ground surface to a subsurface zone 9. The location of zone 9 is selected depending on various known factors relating to the location of the contaminant plume (not shown) and to the existent hydrogeological features of the subsurface. Typically, zone 9 is "downstream" from the contaminant zone such that the contaminants will flow through zone 9. Well 4 is an injection well as is known to the art, and may take the form of a lance, tube, rod, or equivalent structure. Well 4 has at least two reagent conduits 14, 16 extending into well 4. Conduits 14, 16 may terminate at any selected point within well 4, the selected point being chosen to ensure efficient operation of the well, adequate mixing of the reagents, and other factors. An isolating packer 5 may be placed within well 4 to prevent any backflow in well 4. Well 4 is also provided with a well screen 7, which may take the form of openings or slots in the well 4 to allow material in the well to be injected into the subsurface system.

As shown in FIG. 1 diagrammatically, precursor reagent conduit 14 is connected to a source 1 of a first energetic oxidant precursor reagent. The source 1 is connected via piping to a pump 3, which pumps the precursor reagent to and through conduit 14 and hence to the interior of well 4. Likewise, precursor reagent conduit 16 is connected to a source 2 of a second energetic oxidant precursor reagent, which is also pumped via a pump 3 to conduit 16. The reagents, which, upon mixing, will create the energetic oxidant solution, are separately pumped or conveyed through separate respective conduits 14, 16 to the injection well 4. Where Fenton's reagent is the selected solution, for example, source 1 can contain a solution of hydrogen peroxide and source 2 can contain dissolved ferrous sulfate. The well 4 may have a mixing zone or chamber if desired (not shown), or the reagents may simply mix within the well.

The reagents will begin to react promptly upon being mixed to form the desired energetic oxidant solution containing free radicals. Depending on the rate of injection, the mixture may continue to react and produce radicals after injection. As shown in FIG. 1, the energetic oxidant solution 8 is injected from well 4, as shown by the arrows, into zone 9. Upon injection, the energetic oxidant solution 8 mixes with the extant groundwater to form an oxidative mixture. Alternatively, if there is little or no water in the subsurface system into which the injection is made, the energetic oxidant solution is itself the oxidative mixture. As the oxidative mixture permeates the selected zone 9, the free radicals react with native or anthropogenic metals and other materials to form the solid metal peroxides throughout zone 9. This is shown diagrammatically in inset 12 in which the energetic oxidant free radicals 10 (designated as ".e.o.") react with a metal 11 to form the solid metal peroxide. As is known in the art, the amount of the mixture injected, and the injection rate, can be controlled as desired to create a zone of metal peroxides within the groundwater or soil, the resulting zone having the desired characteristics such as the physical extent thereof.

Through the use of the apparatus illustrated in FIG. 1, a zone 9 of metal peroxides can be formed in the subsurface system. With a single injection well 4 as a "point source" for the energetic oxidant solution, a zone 9 can be formed surrounding this "point source." As is known in the art of injection techniques, however, the placement of the resulting zone 9 can be affected as desired. It is known, for example, to establish one or more extraction wells (not shown) in conjunction with injection wells. As fluid is injected into a subsurface region by an injection well, fluid is extracted from a different location via an extraction well. Thus, even with a single injection well, this and other known techniques can control the final placement of zone 9.

Figure 2:
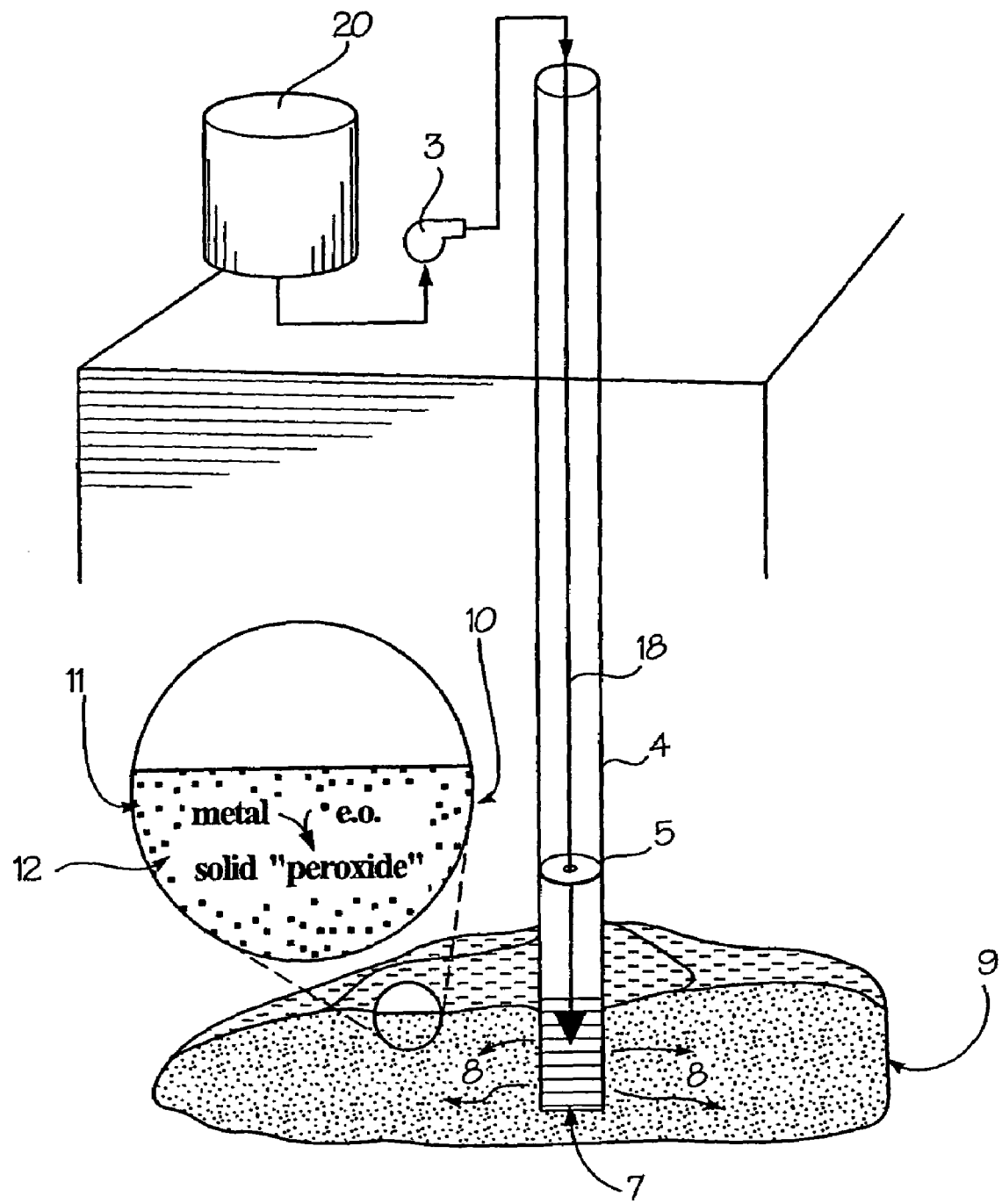
FIG. 2 is a diagrammatic illustration of apparatus for practicing a second preferred embodiment of the method of the current invention.

A second injection process is illustrated in FIG. 2, wherein like numbers indicate like elements. The injection process illustrated in FIG. 2 consists of mixing the selected energetic oxidant precursor reagents in a mixing tank or chamber to form the energetic oxidant solution prior to directing the solution to an injection well or other means for conveying the liquid to the desired site. As shown in FIG. 2, an injection well 4 as defined above is provided. As in FIG. 1, well 4 extends into a zone 9. Well 4 is provided with a well screen 7 and may be provided with an isolating packer 5. For practicing the method of the current invention in this embodiment, well 4 is provided with a single conduit 18. Conduit 18 is connected to a source 20. The connection between conduit 18 and source 20 includes a pump 3. In this instance, source 20 is a container holding the energetic oxidant solution. The energetic oxidant solution is pumped from source 20 by pump 3 through conduit 18 and is injected via well screen 7 to form zone 9. Source 20 can be a mixing tank or similar structure and may be supplied with appropriate precursor reagents in a batch wise or continuous manner. It is noted that the formation of the unstable free radicals will begin immediately or almost immediately upon the mixing of the reagents, and it is preferred that the injection take place within a reasonably short period of time after the initial mixing. This strategy may be useful in certain conditions relating to the type or location of the injection well, the conditions obtaining at the point of injection, or both. Where, for example, the interior volume of the injection well 4 being used at a specific site is small, either in terms of total volume or in dimension (e.g., in cross-section), complete mixing of the two reagents as shown in FIG. 1 may be problematic. Mixing the reagents prior to introducing them to the injection well overcomes this problem. Another situation in which pre-mixing may be preferred involves injection into an aquifer having a relatively high rate of water flow. Under such conditions, it may be preferable to ensure that the reagents are completely mixed, and the free radical-producing reactions relatively advanced, prior to injecting the mixture into the aquifer or other destination. A wide variety of conditions other than those described herein may also make premixing a preferred alternative for the injection strategy for the method of this invention. As with the methodology illustrated in FIG. 1, adjunct equipment such as extraction wells (not shown) may be used to influence and control the final location, shape and extent of zone 9.

Figure 3:
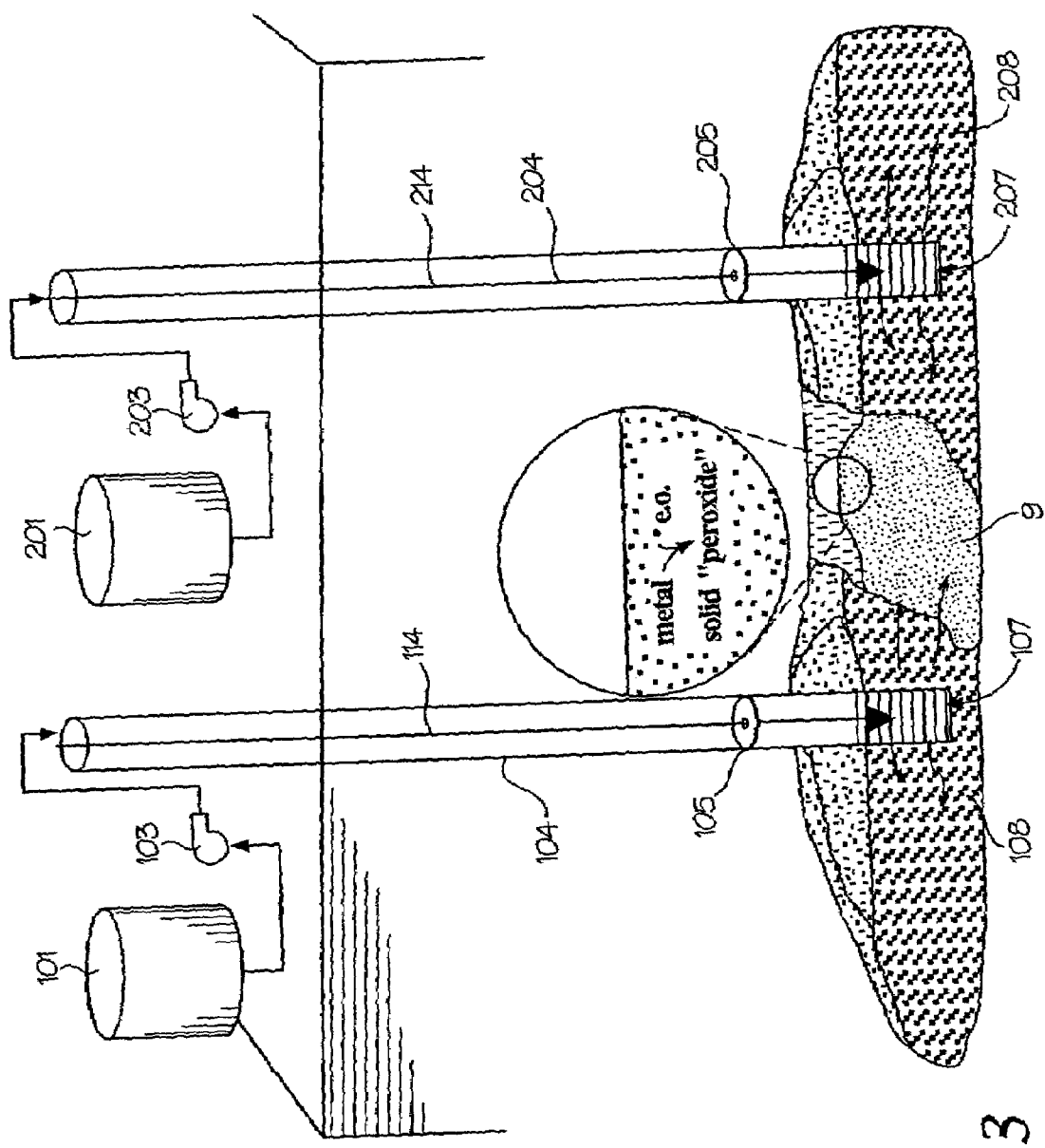
FIG. 3 is a diagrammatic illustration of apparatus for practicing a third preferred embodiment of the method of the current invention.

A third injection process is illustrated in FIG. 3, wherein like numbers indicate like structures. This process involves the use of two or more injection wells or sites. As shown in FIG. 3, a first injection well 104 is provided at a first location. As described above, well 104 is provided with a well screen 107 and may be provided with an isolating packer 105. Well 104 is provided with at least one conduit 114, which in turn is connected to a source 101. The connection between source 101 and conduit 114 includes a pump 103. There is also provided at a second location a second injection well 204 with a well screen 207 and, optionally, an isolating packer 205. Second well 204 has a conduit 214 which is connected to a source 201, the connection including a pump 203. According to this strategy, one of the precursor reagents, e.g., from source 101, is injected into the aquifer or soil at one or more injection sites via a well, borehole, or other means, e.g., well 104, while the other of the precursor reagents is injected at one or more other injection sites via a well 204 supplied by a source 201. The sites, as well as the injection rates and volumes for the reagents, are selected such that the two or more "reagent plumes" formed by the separate injections, illustrated diagrammatically in FIG. 3 as plumes 108 and 208 will eventually overlap. This will result in mixing of the reagents and generation of the energetic oxidant solution containing free radicals to form the desired metal peroxides in a zone 9. The mixing takes place at a locating referred to herein as a reaction zone, shown as zone 9 in FIG. 3.

This third injection process may be useful in a wide variety of circumstances, by way of example. This third injection process may be useful in circumstances where the targeted contaminant plume, or an area in front (downstream) of the contaminant plume is not accessible from the surface. That is, the presence of surface buildings, roads, or farmland may make placement of an injection well practicable. Geological formations, such as layers of rock, may also make the placement of a single injection site problematic. Placement of injection wells for the reagents at locations laterally displaced from the direction of travel of the contaminant plume, however, may be possible. Injection of the reagents in the laterally placed wells will create a reaction zone between the two injection wells, resulting in the formation of metal peroxides at a desired point downstream from the contaminant plume.

Selected placement of the reagent injection sites also makes it possible to "aim" the reaction zone with respect to the contaminant plume. That is, by evaluating the direction and flow rate of water within an aquifer, for example, reagent injection sites can be selected such that the "reagent plumes" converge in a reaction zone that is not necessarily located laterally between the reagent injection sites. The "target" for the reaction zone may be the contaminant plume itself or, for example, an area relatively rich in native metals that will be converted to the peroxide form by the reaction of the reagents. As described above with the embodiments illustrated in FIGS. 1 and 2, the location of reactant zone 9 can also be influenced and controlled further through the use of extraction wells located at selected sites.

The method of the invention can be used alone, or in combination with other remedial techniques. Most soils will contain a sufficient quantity of materials such as calcium and magnesium for conversion to the peroxide form. Where the soil does not, or where it is desired to enhance the natural level of such materials, such materials may be added by injection prior to the injection of the energetic oxidant solution or by injection of such materials along with injection of the solution or the reagents that will form the solution. Those of ordinary skill in the art will be aware of other variations that are within the scope of the claimed invention, which is to be measured by the claims appurtenant to this disclosure.

We claim:

1. A method for providing the in situ creation of a widespread, long-term source of oxygen in subsurface groundwater or soil, said method comprising the steps of:
   a) determining the quantity of peroxidizable metal in the subsurface groundwater or soil of a selected site that is available for reacting to create metal peroxides;
   b) creating an aqueous reagent solution containing energetic oxidizing free radicals; and,
   c) injecting said solution into said groundwater or soil in an amount sufficient to convert said metals into solid metal peroxides whereby a long term source of oxygen is provided.

2. The method of claim 1 wherein said peroxidizable metals are selected from the group consisting of magnesium, calcium, and other alkaline earth metals.

3. The method of claim 1 wherein said aqueous reagent solution comprises superoxide or hydroxyl radicals.

4. The method of claim 1 wherein said aqueous reagent solution contains radicals selected from the group consisting of nitric oxide, permanganate, hydroxyl radicals, perchlorate, persulfate, and chloride.

5. The method of claim 1 including, after step (a) but before step (c) the steps of providing a metal solution which is suitable for injection into the soil or groundwater and injecting said metal solution into the soil or groundwater.

6. A method for providing the in situ creation of a widespread, long-term source of oxygen in subsurface ground water or soil comprising the steps of:
   a) determining the quantity of peroxidizable metal in the subsurface groundwater or soil that is available for reacting to create metal peroxides at a selected site;
   b) creating an aqueous reagent solution comprising additional peroxidizable metals;
   c) creating another aqueous reagent solution comprising energetic oxidant free radicals;
   d) injecting said solutions into the groundwater or soil in locations at the selected site that are spaced apart each from the other, said solutions being injected in quantities sufficient to react to form solid metal peroxides; and
   converting said peroxidizable metals of steps a) and b) Into said solid metal peroxides at subsurface locations where said solutions mix.

7. The method of claim 6 wherein the peroxidizable metals are selected from the group consisting of calcium, magnesium, and other alkali earth metals.

8. The method of claim 6 wherein said energetic oxidant free radicals are selected from the group consisting of nitric oxide, permanganate, perchlotare, persulfate, and chloride radicals.

9. A method for in situ treatment of contaminants in groundwater or soil comprising the steps of:
   a) determining the quantity of peroxidizable material in the groundwater or soil of a site selected for treatment;
   b) providing precursor reagents, the mixture of which will produce an energetic oxidant solution containing free radicals;
   c) injecting the precursor reagents separately into the soil or groundwater to be treated in an amount sufficient to create solid peroxide material in the soil from said peroxidizable material or groundwater, whereby the solid peroxidized material provides for the long-term release of oxygen sufficient to treat said contaminants.

10. The method of claim 9 wherein the injection step is performed by injecting the first of said reactants at a first site and the second reactant at a second site which is spaced apart from the first site whereby a subsurface reaction zone is initiated between said sites.

* * * * *